(12) United States Patent
Eungard

(10) Patent No.: US 8,181,401 B2
(45) Date of Patent: May 22, 2012

(54) LOADING DOCK TRUCK AND TRAILER SEALS AND ASSOCIATED SYSTEMS AND METHODS

(75) Inventor: William C. Eungard, Waterford, WI (US)

(73) Assignee: 4Front Engineered Solutions, Inc., Carrollton, TX (US)

( * ) Notice: Subject to any disclaimer, the term of this patent is extended or adjusted under 35 U.S.C. 154(b) by 545 days.

(21) Appl. No.: 12/360,082

(22) Filed: Jan. 26, 2009

(65) Prior Publication Data

US 2010/0186318 A1      Jul. 29, 2010

(51) Int. Cl.
*E04B 1/62*      (2006.01)
(52) U.S. Cl. .................. 52/173.2; 52/173.1; 52/2.12
(58) Field of Classification Search .......... 52/173.1, 52/173.2, 2.12; 293/107, 108, 109; 428/158, 428/159, 160; 5/724
See application file for complete search history.

(56) References Cited

U.S. PATENT DOCUMENTS

| | | | |
|---|---|---|---|
| 2,704,574 | A | 3/1955 | Etlar |
| 3,181,205 | A | 5/1965 | Frommelt et al. |
| 3,230,675 | A | 1/1966 | Frommelt et al. |
| 3,286,417 | A | 11/1966 | Dazzo |
| 3,375,625 | A | 4/1968 | Edkins et al. |
| 3,403,489 | A | 10/1968 | Frommelt et al. |
| 3,461,627 | A | 8/1969 | Conger |
| 3,500,599 | A | 3/1970 | Sciolino |
| 3,613,324 | A | 10/1971 | Conger |
| 3,875,954 | A | 4/1975 | Frommelt et al. |
| 4,015,380 | A | 4/1977 | Chalfant |
| 4,038,792 | A | 8/1977 | McGuire et al. |
| 4,213,279 | A | 7/1980 | Layne |
| 4,286,410 | A | 9/1981 | Hahn |
| 4,293,969 | A | 10/1981 | Frommelt |
| 4,365,452 | A | 12/1982 | Fillman et al. |
| 4,381,631 | A | 5/1983 | Frommelt |
| 4,422,199 | A | 12/1983 | Frommelt |
| 4,557,008 | A | 12/1985 | Jurden |
| 4,574,542 | A | 3/1986 | Kleynjans |
| 4,601,142 | A | 7/1986 | Frommelt |

(Continued)

FOREIGN PATENT DOCUMENTS

AU      2006230657      5/2007

(Continued)

OTHER PUBLICATIONS

U.S. Appl. No. 11/860,468, filed Sep. 24, 2007, Tramonte et al.

(Continued)

*Primary Examiner* — Jeanette E Chapman
*Assistant Examiner* — James Buckle, Jr.
(74) *Attorney, Agent, or Firm* — Perkins Coie LLP

(57) ABSTRACT

Apparatuses for forming at least a partial seal between an open end of a truck, trailer, or other vehicle and an opening in a building are disclosed herein. In one embodiment, an apparatus for forming at least a partial seal includes a first side pad configured to extend vertically adjacent to a first side portion of an opening, a second side pad configured to extend vertically adjacent to a second side portion of the opening, and a head pad assembly configured to extend horizontally adjacent to a top portion of the opening between the first and second side pads. The head pad assembly can include replaceable corner pads positioned on either end of a center pad. The corner pads can be independently attached to the wall of the building and separately removed if replacement is needed.

23 Claims, 8 Drawing Sheets

U.S. PATENT DOCUMENTS

| | | | |
|---|---|---|---|
| 4,636,423 A | 1/1987 | Reid |
| 4,638,612 A | 1/1987 | Bennett |
| 4,682,382 A | 7/1987 | Bennett |
| 4,716,697 A | 1/1988 | Snyder |
| 4,718,207 A | 1/1988 | Frommelt |
| 4,744,121 A | 5/1988 | Swessel et al. |
| 4,799,342 A | 1/1989 | Klevnjans |
| 4,805,362 A | 2/1989 | Frommelt et al. |
| 4,821,468 A | 4/1989 | Moore et al. |
| 4,825,607 A | 5/1989 | Frommelt et al. |
| 4,885,881 A | 12/1989 | Lenz |
| 4,916,870 A | 4/1990 | Moore et al. |
| 5,001,799 A | 3/1991 | Alexander et al. |
| 5,048,246 A | 9/1991 | Sullivan |
| 5,088,143 A | 2/1992 | Alexander |
| 5,125,196 A | 6/1992 | Moody |
| 5,174,084 A | 12/1992 | Alten |
| 5,185,977 A | 2/1993 | Brockman et al. |
| 5,282,342 A | 2/1994 | Brockman et al. |
| 5,313,681 A | 5/1994 | Alexander |
| 5,333,424 A | 8/1994 | Chalfant et al. |
| 5,394,662 A | 3/1995 | Giuliani et al. |
| 5,396,676 A | 3/1995 | Alexander et al. |
| 5,442,825 A | 8/1995 | Hahn et al. |
| 5,473,846 A | 12/1995 | Giuliani et al. |
| 5,475,888 A | 12/1995 | Massey |
| 5,533,218 A | 7/1996 | Fahy |
| 5,553,424 A | 9/1996 | Brockman et al. |
| 5,622,016 A | 4/1997 | Frommelt et al. |
| 5,675,945 A | 10/1997 | Giuliani et al. |
| 5,775,044 A | 7/1998 | Styba et al. |
| 5,953,868 A | 9/1999 | Giuliani et al. |
| 5,996,291 A | 12/1999 | Styba et al. |
| 6,014,844 A | 1/2000 | Thill |
| 6,073,402 A | 6/2000 | Moody |
| 6,125,491 A | 10/2000 | Alexander |
| 6,205,721 B1 | 3/2001 | Ashelin et al. |
| 6,311,435 B1 | 11/2001 | Brockman et al. |
| 6,374,554 B1 | 4/2002 | Eungard |
| 6,399,189 B1 | 6/2002 | Kobayashi et al. |
| 6,425,214 B1 | 7/2002 | Boffeli et al. |
| 6,442,783 B1 | 9/2002 | Yoon et al. |
| 6,502,268 B2 | 1/2003 | Ashelin et al. |
| 6,654,976 B2 | 12/2003 | Digmann et al. |
| 6,810,817 B1 | 11/2004 | James |
| 6,854,224 B2 | 2/2005 | Thill et al. |
| 6,948,285 B2 | 9/2005 | Miller et al. |
| 7,146,673 B1 | 12/2006 | Digmann et al. |
| 7,162,762 B1 | 1/2007 | Gleason |
| 7,184,194 B2 | 2/2007 | Wood |
| 7,230,819 B2 | 6/2007 | Muchow et al. |
| 7,254,922 B2 | 8/2007 | Brockman et al. |
| 7,334,281 B2 | 2/2008 | Digmann et al. |
| 7,383,664 B2 * | 6/2008 | Chalfant | 52/173.2 |
| 7,444,785 B2 | 11/2008 | Dillon et al. |
| 7,781,292 B2 | 8/2010 | Gambino et al. |
| 2002/0148177 A1 | 10/2002 | DiBiase |
| 2003/0177720 A1 | 9/2003 | Hoffmann et al. |
| 2004/0123532 A1 * | 7/2004 | Thill et al. | 52/173.2 |
| 2004/0134139 A1 | 7/2004 | Busch et al. |
| 2004/0261335 A1 | 12/2004 | Eungard |
| 2005/0102929 A1 | 5/2005 | Hoffmann et al. |
| 2005/0178077 A1 | 8/2005 | Shelton |
| 2006/0026912 A1 | 2/2006 | Eungard et al. |
| 2006/0032159 A1 | 2/2006 | Eungard et al. |
| 2006/0090407 A1 | 5/2006 | Hoffmann et al. |
| 2007/0101517 A1 | 5/2007 | Digmann et al. |
| 2007/0101518 A1 | 5/2007 | Digmann et al. |
| 2008/0052843 A1 | 3/2008 | Eungard et al. |
| 2008/0104902 A1 | 5/2008 | Ashelin et al. |
| 2008/0289270 A1 | 11/2008 | Chalfant |
| 2009/0044453 A1 | 2/2009 | Meichtry |
| 2009/0044454 A1 | 2/2009 | Meichtry |
| 2009/0044917 A1 | 2/2009 | Meichtry |
| 2009/0045649 A1 | 2/2009 | Eungard et al. |
| 2009/0064605 A1 | 3/2009 | Hoffman |
| 2009/0077906 A1 * | 3/2009 | Tramonte et al. | 52/173.2 |
| 2009/0293382 A1 * | 12/2009 | Digmann et al. | 52/173.2 |
| 2010/0031457 A1 | 2/2010 | Gleason et al. |
| 2010/0251639 A1 * | 10/2010 | Hoffmann et al. | 52/173.2 |
| 2010/0269427 A1 * | 10/2010 | Digmann et al. | 52/173.2 |
| 2010/0319143 A1 | 12/2010 | Wessel |

FOREIGN PATENT DOCUMENTS

| | | |
|---|---|---|
| EP | 0173929 | 3/1986 |
| EP | 0477656 | 4/1992 |
| WO | WO9410073 | 5/1994 |
| WO | WO-0027734 | 5/2000 |
| WO | WO-2006052661 | 5/2006 |
| WO | WO2007056744 | 5/2007 |
| WO | WO2007076507 | 7/2007 |
| WO | WO-2008057682 | 5/2008 |
| WO | WO-2009032441 | 3/2009 |

OTHER PUBLICATIONS

U.S. Appl. No. 12/334,167, filed Dec. 12, 2008, Eungard.
4Front Engineered Solutions, Inc., DSH Series Dock Seals Installation Instructions, Form No. 4F-DSH-1/07.
4Front Engineered Solutions, Inc., DSHL Series Dock Seals Installation Instructions, Form No. 4F-DSHL-1/07.
4Front Engineered Solutions, Inc., DSS & WM Series Dock Seals Installation Instructions, Form No. 4F-DSS-1/07.
4Front Engineered Solutions, Inc., VSH Series Dock Seals Installation Instructions, Form No. 4F-VSH-1/07.
Frommelt Eliminator II Series Soft-Sided Shelters, Frommelt Products Corporation, 6 pages, 2002.
Frommelt Insulator Dock Sealing System, Frommelt Products Corporation, 4 pages, 2001.
Kelley DSS Series Dock Seal With Stationary Head Pad, Kelley Dock Seals, 4Front Engineered Solutions 2007.
Series 1600 WeatherGuard Header Seals, Fairborn USA Inc., 2 pages, 2004.
Kelley Weatherseal Installation Instructions '4 Series' Dockboard, Kelley Company, Inc., Doc. No. 5164, Mar. 2, 1981, 2 pgs.
Kelley aFX/aFX-S Dock Leveler Safe T Frame, User's Manual, Installation, Operations, Maintenance and Parts, 4Front Engineered Solutions, Inc., 2008.
Dock Leveler Weatherseals, Rite Hite Corp., 2008, 3 pgs.
Kelley Weatherseal Installation, Kelley Company, Inc., Doc. No. 5141, Aug. 2, 1978, 1 pg.
Frommelt PitMaster Under-Leveler Seal, Rite Hite Corp., 2008, 2 pgs.
Frommelt VHLS Vertical Under-leveler Seal, Installation Instructions, Frommelt Products Corporation, Pub. No. VHLS-0003, May 2007, 16 pgs.
Frommelt VHL Under-leveler Seal (Model VHLS), Architectural Specifications, date unknown, 2 pgs.
Frommelt VHLS Under-leveler Seal for Vertical Hydraulic Leveler, Rite-Hite Holding Corporation, 1 pg. [Internet accessed Aug. 28, 2007].
Drawing No. 707-312 Rear Hinge w/s Assembly, Kelly Company, Inc., Nov. 15, 2008.
4Front Engineered Solutions, Inc., Rear Hinge Installation Pub. No. AP5525 RA p. 3, Jun. 2011, 1 pg.

* cited by examiner

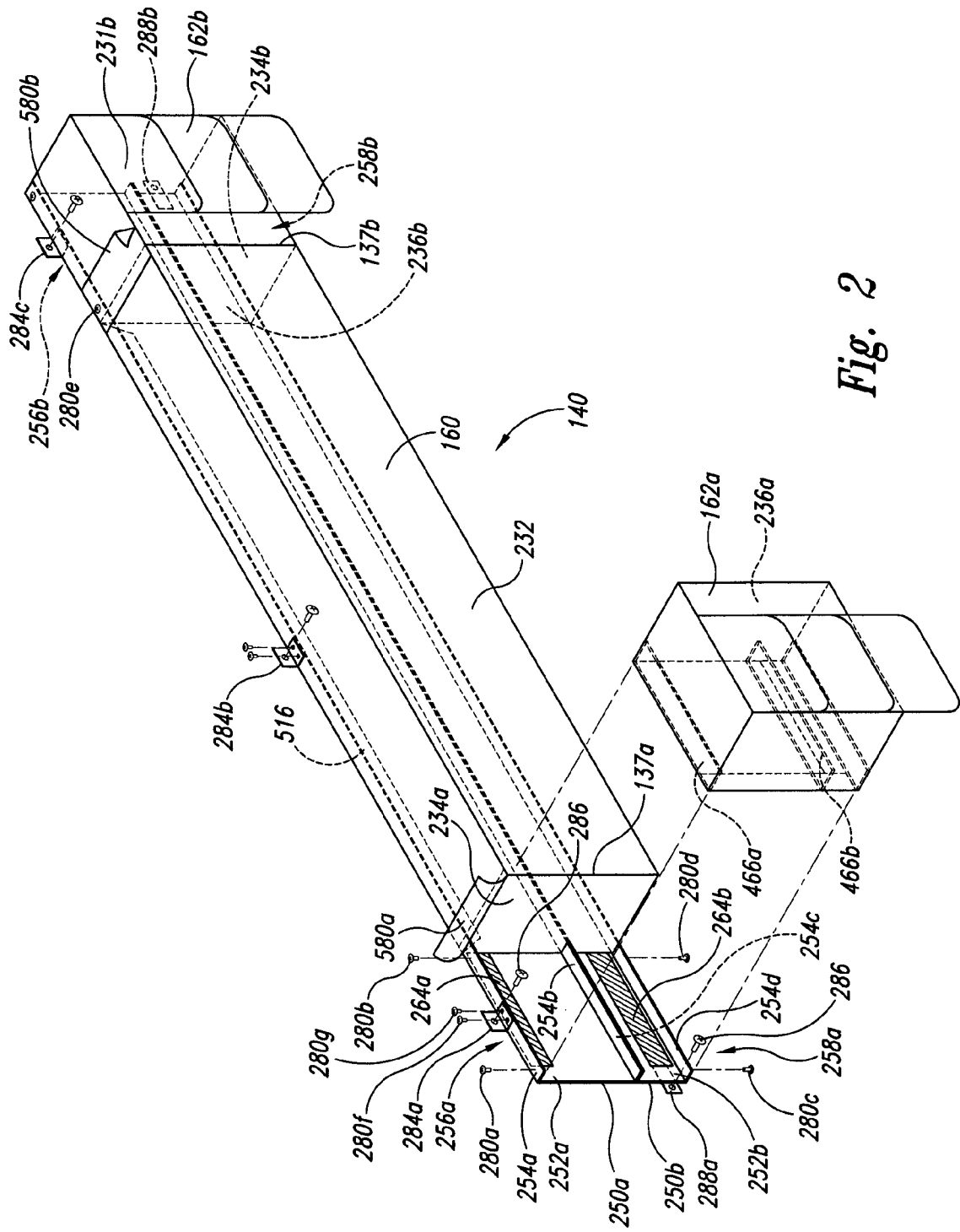

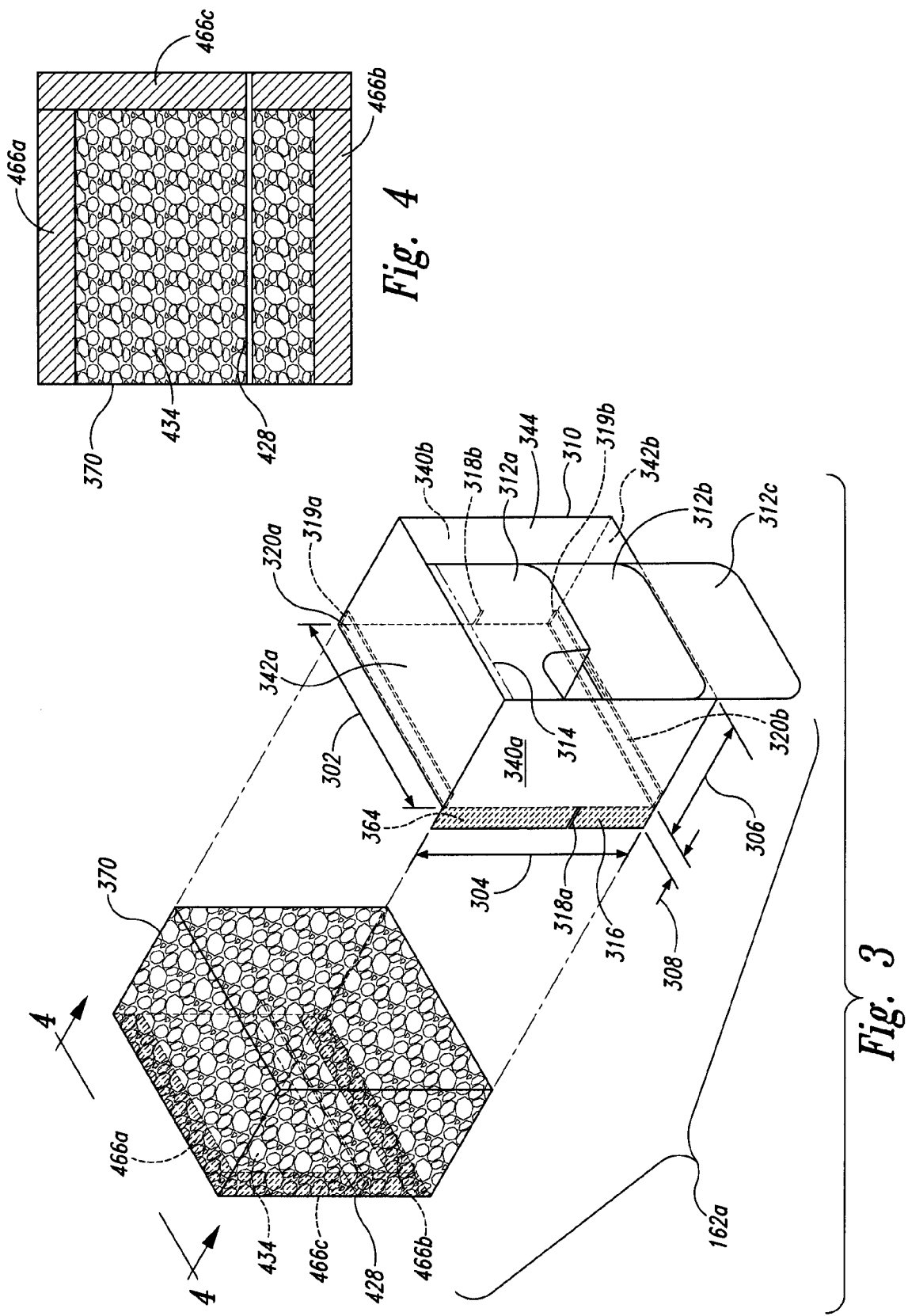

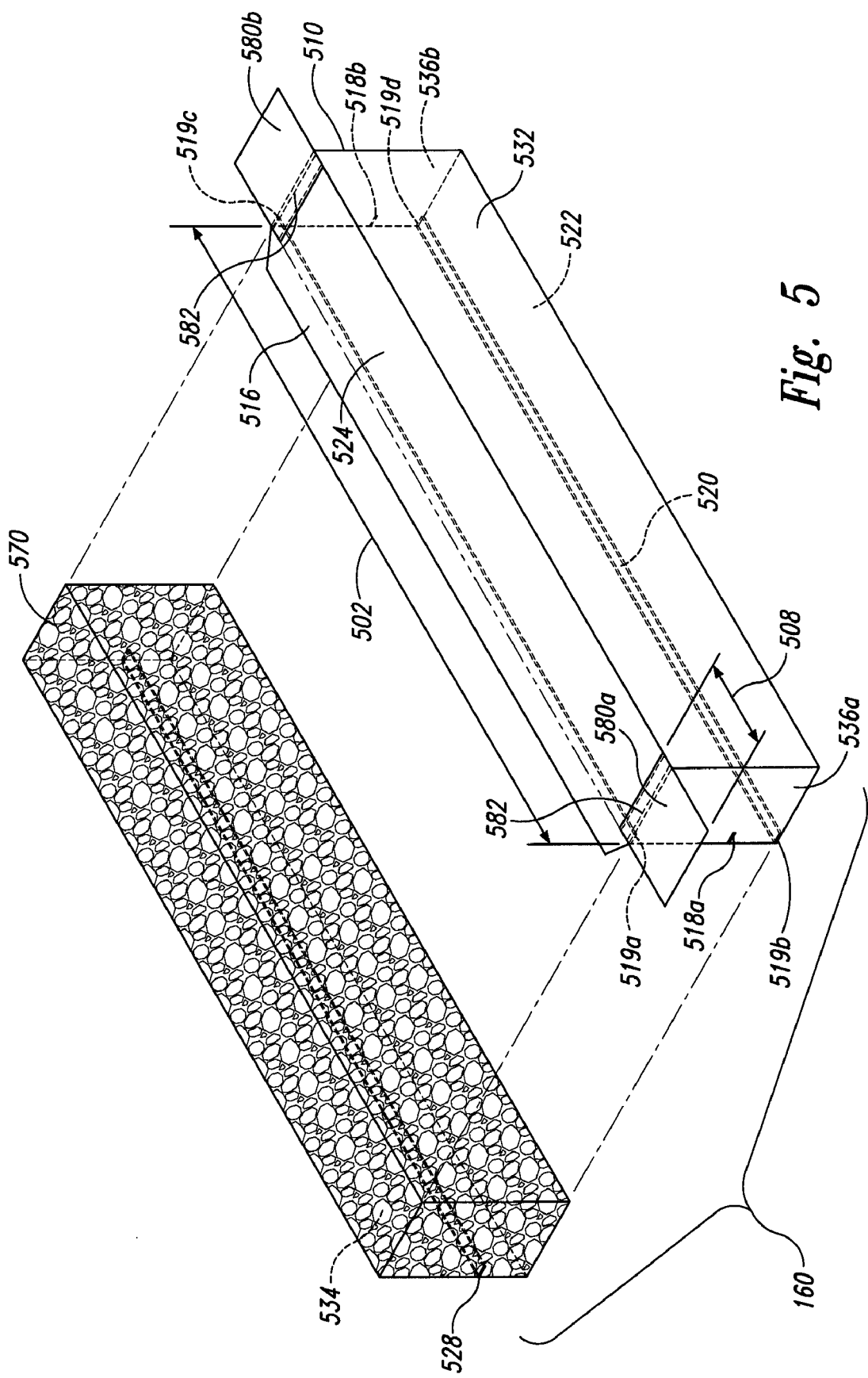

LOADING DOCK TRUCK AND TRAILER SEALS AND ASSOCIATED SYSTEMS AND METHODS

TECHNICAL FIELD

The present disclosure relates generally to loading dock seals and/or shelters for use with trucks and shipping trailers, and associated systems and methods.

BACKGROUND

Warehouses, manufacturing facilities, large retail outlets and other buildings often include one or more loading docks for transferring goods and materials to and from trucks and trailers. Conventional loading docks typically include an elevated doorway or opening in an exterior side wall of a building. The opening is usually covered by a roll up door, and is typically positioned a few feet above the ground so that it will be approximately level with the beds of trucks and shipping trailers. The dock can include a dock leveler with a movable deck or ramp to adjust for any misalignment between the floor of the loading dock and the bed of the trailer. To load or unload goods from a trailer, the doors on the aft end of the trailer are opened and the trailer is backed up to the loading dock opening. After the dock leveler has been extended onto the trailer bed, workers, fork lifts, etc. can move into and out of the trailer to load or unload goods.

It is often desirable to seal any gaps that may exist between the open end of the trailer and the loading dock wall, as these gaps can allow rain, snow, or outside air to enter the building resulting in energy losses and/or undesirable working conditions. These gaps are typically sealed with either a dock seal or shelter that extends at least partially around the loading dock opening.

There are various types of loading dock enclosures that are used for sheltering and/or sealing the open end of a truck or trailer during the loading and unloading process. Such enclosures are described in, for example, U.S. patent application Ser. Nos.: 12/334,167 and 11/860,468; U.S. Pat. Nos.: 4,213,279; 4,601,142; 4,711,059; 4,718,207; 4,799,342; 4,885,881; 5,282,384; 5,953,868; and 6,311,435; U.S. Patent Publication Nos.: 2003/0177720 and 2004/0134139; International Patent Publication No. WO 2006/052661; and the Installation Instructions for the VSH Series Dock Seals, Form No. 4F-VSH-1/07, and the DSS & WM Series Dock Seals, Form No. 4F-DSS-1/07, both of which are available from 4Front Engineered Solutions, Inc., Muskego, Wis. 53150. The disclosures of the above-listed patents, patent applications and other documents are incorporated into the present disclosure in their entireties by reference.

Many conventional loading dock seals include resilient, compressible pads that are attached to the building along the lateral and top edges of the loading dock opening. The pads typically include a foam core covered with a coated vinyl fabric or other similar material for protection and appearance. In operation, the open trailer backs up against the seal and compresses the pads. The pads conform to the outer edge of the trailer opening as the trailer presses up against the pads, which helps seal the gap between the side of the building and the open trailer.

Wear and tear on dock seals from repeated compression by trailers can shorten the life of the seal. As the trailers compress the dock seal pads, the fabric covers can be punctured or otherwise damaged. Moreover, trailers with air-ride and other types of suspension can move up and down during loading/unloading. The abrasive forces from this movement can eventually wear through the fabric cover. If the fabric is punctured or torn, the foam core can be exposed to the elements and damaged by moisture, sunlight, etc. This can degrade the foam and impair the sealing capability of the pad, requiring costly and time consuming repairs or replacement.

BRIEF DESCRIPTION OF THE DRAWINGS

FIG. 2 is a partially exploded enlarged isometric view of a dock seal head pad assembly configured in accordance with an embodiment of the disclosure.

FIG. 3 is a partially exploded enlarged isometric view of a replaceable corner pad from the head pad assembly of FIG. 2.

FIG. 4 is a rear view of a corner pad core, taken substantially along line 4-4 in FIG. 3.

FIG. 5 is a partially exploded enlarged isometric view of a center pad from the head pad assembly of FIG. 2.

DETAILED DESCRIPTION

The following disclosure describes various embodiments of loading dock seals and shelters, and associated systems and methods of manufacture and use. In one embodiment, for example, a loading dock seal includes a head pad assembly and two side pads that seal against the top and sides, respectively, of an open trailer, truck, or other vehicle. In one aspect of this embodiment, the head pad assembly includes three compressible sections or pads. More specifically, in this embodiment the head pad assembly includes two corner pads positioned on opposite ends of a middle or center pad above the respective side pad. Because of the increased wear and tear that corner pads often see in service, the corner pads are configured to be easily removed and replaced if damaged, without having to remove the center pad or either of the two side pads.

Certain details are set forth in the following description and in FIGS. 1-9 to provide a thorough understanding of various embodiments of the disclosure. Other details describing well-known structures and systems often associated with loading docks and loading dock seals, shelters and enclosures, however, have not been set forth in the following disclosure to avoid unnecessarily obscuring the description of the various embodiments of the disclosure.

Many of the details, dimensions, angles and other features shown in the Figures are merely illustrative of particular embodiments of the disclosure. Accordingly, other embodiments can have other details, dimensions, angles and features without departing from the spirit or scope of the present disclosure. In addition, those of ordinary skill in the art will appreciate that further embodiments of the disclosure can be practiced without several of the details described below.

In the Figures, identical reference numbers identify identical or at least generally similar elements. To facilitate the discussion of any particular element, the most significant digit or digits of any referenced number refer to the Figure in which that element is first introduced. For example, element 120 is first introduced and discussed with reference to FIG. 1.

Figure 1:
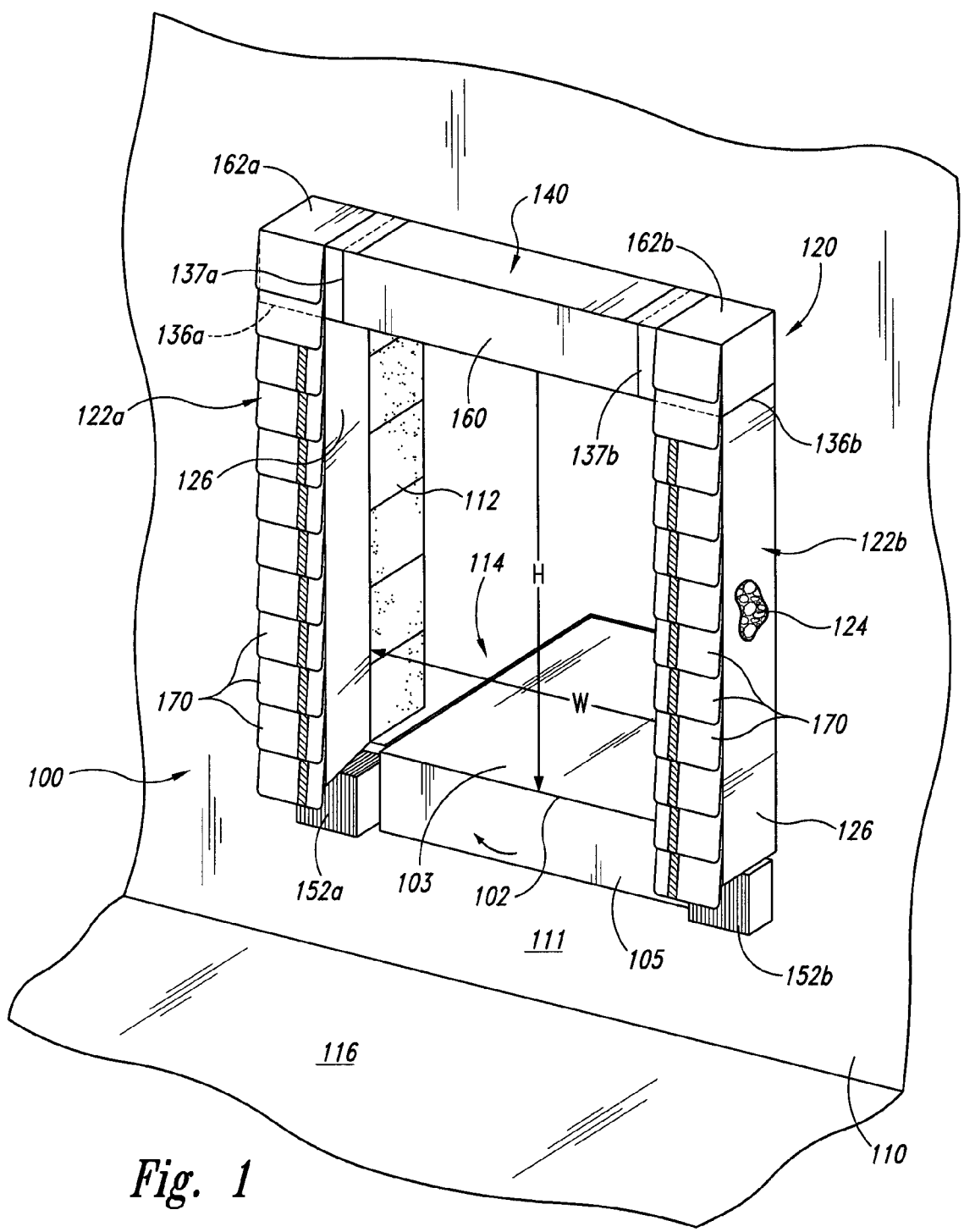
FIG. 1 is an isometric view of a loading dock having a dock seal configured in accordance with an embodiment of the disclosure.

FIG. 1 is an isometric view of a loading dock 100 having a dock seal 120 configured in accordance with an embodiment of the disclosure. In the illustrated embodiment, the dock seal 120 is positioned around an opening 112 in a warehouse or other building 110. The opening 112 can be at least generally similar in size and shape to conventional trailer truck openings having widths W of approximately 8 feet and heights H of approximately 9 feet. In other embodiments, however, the opening 112 can have other sizes, shapes, and/or dimensions depending on the type of vehicle or vehicles the opening is designed to accommodate and/or other factors.

Although not shown in FIG. 1, the opening 112 can be temporarily closed off with various types of doors known in the art. Such doors can include, for example, suitable overhead doors, sliding doors, etc. In the illustrated embodiment, the loading dock 100 includes a dock leveler 102 having a movable ramp 103 with an extendable lip 105 that can rotate outwardly to provide an adjustable-height path or bridge between a floor 114 of the building 110 and a bed of a truck, trailer, or other vehicle (not shown in FIG. 1) backed up to the loading dock 100. The loading dock 100 can also include bumpers 152 (e.g., rubber bumpers; identified individually as a first bumper 152a and a second bumper 152b) attached to the building 110 proximate to the lower corners of the opening 112. The bumpers 152 can help absorb the impact from shipping trailers and other vehicles as they back into the loading dock 100. In the illustrated embodiment, the opening 112 can be positioned at a height of from about 46 inches to about 56 inches above a driveway 116, and the driveway 116 can have a grade of from about 0% to about +/−4%. As those of ordinary skill in the art will appreciate, however, in other embodiments dock seals configured in accordance with the present disclosure can be used with other openings having other elevations and other driveway grades.

In the illustrated embodiment, the dock seal 120 includes a compressible head member assembly or head pad assembly 140 that extends between two compressible side members or side pads 122. More specifically, the dock seal 120 includes a first side pad 122a extending vertically along a first side portion of the opening 112, and a second side pad 122b extending vertically along a second side portion of the opening 112 opposite the first side portion. The head pad assembly 140 extends horizontally across a top portion of the opening 112 between the first side pad 122a and the second side pad 122b.

In the illustrated embodiment, the first and second side pads 122a and 122b are left-hand and right-hand versions of each other. The side pads 122 can include a resilient, compressible core material 124 covered by a durable covering 126 (e.g., a fabric covering). In one embodiment, the compressible core material 124 can include compressible foam (e.g., flexible polyurethane foam, such as polyurethane foam having a density from about 0.5 pound per cubic foot to about 2 pound per cubic foot, e.g., about 1 pound per cubic foot) bonded, screwed, or otherwise attached to an elongate backing member or support member (not shown) fixedly attached to an exterior wall 111 of the building 110. The support member can be made from treated wood, metal (e.g., galvanized steel), extruded plastic, and/or other suitable materials known in the art. One advantage of using foam for the core material 124 is that it can return to its original shape after being compressed by a trailer or other structure without sustaining significant damage.

The covering 126 can be made from various types of suitable materials having sufficient strength, durability, manufacturability, cost, and/or other characteristics. Such materials can include, for example, commercially available coated fabrics such as Hypalon®, polyurethane, neoprene, or vinyl-coated fabrics, such as vinyl-coated polyester fabric having a weight of from about 22 ounces to about 60 ounces, e.g., about 40 ounces. In other embodiments, however, the covering 126 can be made from other suitable materials, or it can be omitted if the underlying core material 124 is sufficiently durable by itself. The covering 126 can be attached to the support members with conventional fasteners (e.g., nails, sheet metal screws, self-tapping screws, TEK screws, staples, adhesives, stitching, etc.), fabric or tape hook-and-loop fasteners (e.g., Velcro®), etc.), and/or other suitable means known in the art.

In the illustrated embodiment, each of the side pads 122 includes a plurality of overlapping pleats or flaps 170. The flaps 170 can be constructed of various types of durable and resilient materials such as, for example, vinyl-coated polyester fabric having a weight of from about 22 ounces to about 60 ounces, e.g., about 40 ounces. The upper edge portions of the overlapping flaps 170 can be stitched or otherwise attached to the covering 126 on the front face of the side pads 122 to bear the brunt of trailer contact during use. Although the side pads 122 of the illustrated embodiment have rectangular cross-sections in other embodiments the side pads can have other cross-sectional shapes. Such shapes can include, for example, trapezoidal shapes, four-sided shapes having two right angles and one angled surface, open V-shapes, and/or other cross-sectional shapes known in the art. Accordingly, embodiments of the present disclosure are not limited to side pads and/or head pads having rectangular cross-sections.

In one aspect of this embodiment, the head pad assembly 140 is composed of a plurality of contiguously arranged compressible members or pads. More specifically, the head pad assembly includes a first replaceable corner member or corner pad 162a, a second replaceable corner pad 162b, and a central head member or center pad 160. The first replaceable corner pad 162a is positioned at one end of the center pad 160 above the first side pad 122a, and the second replaceable corner pad 162b positioned at the other end of the center pad 160 above the second side pad 122b. In the illustrated embodiment, the first and second corner pads 162a, b contact the respective side pads 122a, b along first and second horizontal interfaces or joints 136a and 136b, respectively. The first and second corner pads 162a, b contact opposite ends of the center pad 160 along first and second vertical interfaces or joints 137a and 137b, respectively. In other embodiments, the center pad 160 can be omitted and the two corner pads 162 can be enlarged so that they extend across the entire top portion of the opening 112 and contact each other at a single joint toward the center of the opening 112. As described in greater detail below, the corner pads 162 are removably attached to the wall 111 so that one or both of them can be independently replaced in the event of damage without having to remove or replace the center pad 140 and/or the other corner pad 162. Further details regarding the head pad assembly 160 are described below with reference to FIGS. 2-6.

FIG. 2 is a partially exploded enlarged isometric view of the head pad assembly 140 configured in accordance with an embodiment of the disclosure. In one aspect of this embodiment, the head pad assembly 140 includes a plurality of support members 250 (identified individually as a first support member 250a and a second support member 250b). In other embodiments, however, the head pad assembly 140 can include a single support member. As described in greater detail below, in one embodiment the support members 250 can be fixedly attached to the exterior wall 111 of the building 110 above the opening 112 (FIG. 1) using a combination of brackets and fasteners (e.g., screws, expansion anchors, etc.), adhesives, and/or other suitable methods known in the art.

In the illustrated embodiment, each of the support members 250 is an elongate member having a channel or U-shaped cross-section. More specifically, the first support member 250a can include a first leg or flange portion 254a and a second flange portion 254b projecting outwardly from a first base portion 252a. Similarly, the second support member 250b can include a third flange portion 254c and a fourth flange portion 254d projecting outwardly from a second base portion 252b. In the illustrated embodiment, the second flange portion 254b of the first support member 250a is positioned against or abuts the third flange portion 254c of the second support member 250b. In other embodiments, however, the support members 250 can be spaced apart from each other. The support members 250 can be formed from metal (e.g., galvanized steel), wood, extruded plastics, and/or other suitable materials known in the art. Although two support members 250 are shown in FIG. 2, and although the first base portion 252a of the first support member 250a is wider than the second base portion 252b of the second support member 250b, in other embodiments the head pad assembly 140 can include more or fewer support members having other cross-sectional shapes and configurations without departing from the present disclosure.

As described in greater detail below with reference to FIG. 5, in the illustrated embodiment the center pad 160 is configured to be fixably attached to the support members 250. The center pad 160 can include a front surface 232 configured to face outwardly from the building 110 (FIG. 1), and opposing side surfaces 234 (identified individually as a first side surface 234a and a second side surface 234b). The first support member 250a can include a first end portion 256a that extends beyond the first side surface 234a, and a second end portion 256b that extends beyond the second side surface 234b. Similarly, in this embodiment the second support member 250b can include a first end portion 258a that extends beyond the first side surface 234a, and a second end portion 258b that extends beyond the second side surface 234b.

In a further aspect of this embodiment, the first and second support members 250 can carry fastening features for releasably attaching the corner pads 162 to the support members 250 adjacent to the center pad 160. For example, in the illustrated embodiment a first portion of hook-and-loop fastener material 264a (e.g., a first portion of loop material) can be bonded or otherwise attached to the first end portion 256a of the first support member 250a proximate an upper region of the first base portion 252a. Similarly, a second portion of hook-and-loop fastener material 264b (e.g., a second portion of loop material) can be bonded or otherwise attached to the first end portion 258a of the second support member 250b proximate a lower region of the second base portion 252b. Velcro® brand fabrics and tapes are known types of commercially-available hook-and-loop fastener systems that can be used with various embodiments of the disclosure. As is known, hook-and-loop fastener systems consist of two layers: a "hook" side, which is a piece of fabric covered with tiny hooks, and a "loop" side, which is covered with loops. When the two sides are pressed together, the hooks catch in the loops and hold the pieces together. Accordingly, hook materials and loop materials are examples of just some of the fastening features that can be used in various embodiments of the disclosure.

Although not shown in FIG. 2, the second end portion 256b of the first support member 250a and the second end portion 258b of the second support member 250b can also include portions of hook-and-loop fastener materials that are at least generally similar in size and placement to the corresponding portions of hook-and-loop fastener materials 264 positioned on the opposite ends of the support members 250. As described in greater detail below with reference to FIG. 3, each of the replaceable corner pads 162 can also include a releasable mounting system for independently attaching the corner pads 162 to the wall 111 of the building 110. For example, each of the replaceable corner pads 162 can include fastening features (e.g., hook-and-loop fastener material, such as hook material) for releasably attaching the corner pads 162 to the corresponding fastening features (e.g., the hook-and-loop fastener material 264) on the support members 250.

Although the illustrated embodiment utilizes hook-and-loop fasteners for releasably attaching the corner pads 162 to the support members 250, in other embodiments, the replaceable corner pads 162 can be releasably attached to the support members 250 using other types of fastening features including various types of fasteners and/or fastening systems known in the art. Such fasteners can include, for example, various types of buttons, snaps, snap buttons, press-fit connectors, hooks, zippers, screws, bolts and nutplate combinations, double-backed adhesive tape, magnets and/or other types of releasable connectors known in the art.

In the illustrated embodiment, each of the replaceable corner pads 162 includes a corresponding side surface 236 (identified individually as a first side surface 236a and a second side surface 236b). When the replaceable corner pads 162 are removably attached to the support members 250, the side surface 236 of each corner pad 162 is positioned against the adjacent side surface 234 of the center pad 160 to avoid or at least reduce gaps between adjacent pads at the corresponding joints 137. This can promote sealing and reduce water leakage from rain or snow. In the illustrated embodiment, the replaceable corner pads 162 have cross-sectional shapes (e.g., rectangular shapes) that are at least generally similar in size and shape to the cross-sectional shape of the center pad 160. As a result, the head pad assembly 140 of the illustrated embodiment has a generally uniform cross-section when the corner pads 162 are removably installed on opposite ends of the center pad 160. In other embodiments, the replaceable corner pads 162 and/or the center pad 160 can have other cross-sectional shapes, such as trapezoidal or beveled shapes where the top surfaces of the pads are sloped downward and away from the building 110 so that rain, snow, etc. will tend to run off of the head pad assembly 140.

FIG. 3 is a partially exploded enlarged isometric view of the first corner pad 162a configured in accordance with an embodiment of the disclosure. In the illustrated embodiment, the first and second corner pads 162a and 162b are left-hand and right-hand versions (or mirror images) of each other. For purposes of discussion herein, various corner pad embodiments and features will be described and illustrated with reference to the first corner pad 162a. It will be appreciated, however, that second corner pad 162b can have identical or at least generally similar features, and descriptions of the first corner pad 162a can apply equally to the second corner pad 162b.

In one aspect of this embodiment, the first corner pad 162a includes a compressible core 370 and a flexible covering 310.

The covering 310 can be made from a Hypalon®, polyurethane, or vinyl-coated fabric, such as commercially available vinyl-coated polyester fabric having a weight of from about 12 ounces per square yard to about 40 ounces per square yard, e.g., about 22 ounces per square yard. In other embodiments, the covering 310 can be made from other suitable materials known in the art. Alternatively, it is expected that in some embodiments the covering could be omitted if the underlying core 370 is found to be sufficiently durable by itself.

In the illustrated embodiment, the covering 310 is formed into a rectangular, form-fitting cover that fits over at least a portion of the core 370. The covering 310 can include a first side panel 340a, a second side panel 340b, a top panel 342a, a bottom panel 342b, and an adjoining front panel 344. The top panel 342a can include a first reinforced hem 320a extending along a rear edge portion of the top panel 342a. The bottom panel 342b can similarly include a second reinforced hem 320b extending along a rear edge portion of the bottom panel 342b. The reinforced hems 320 can be formed in one embodiment by folding an edge portion of the covering material over one or more times and stitching the overlaying plies together. As described in greater detail below with reference to FIG. 2, the hems 320 can provide reinforcement for one or more fasteners that extend through the covering 310 and into one or more of the flange portions 254 of the support members 250 to releasably attach the corner pad 162 to the support members 250.

In the illustrated embodiment, the corner pad 162a can have a width dimension 302, a height dimension 304, and thickness dimension 306. The width dimension 302 can be from about 10 inches to about 36 inches, e.g., from about 10 inches to about 24 inches, or about 18 inches. The height dimension 304 can be from about 8 inches to about 30 inches, e.g., from about 10 inches to about 24 inches, or about 18 inches. The thickness dimension 306 can be from about 5 inches to about 24 inches, e.g., from about 8 inches to about 20 inches, or about 12 inches. As those of ordinary skill in the art will appreciate, the forgoing dimensions are representative of but one embodiment of the corner pad 162a and the present disclosure is not limited to these dimensions. Accordingly, in other embodiments the corner pad 162a (as well as the cover 310) can have other shapes, sizes, and/or dimensions without departing from the present disclosure.

In another aspect of this embodiment, the covering 310 can include a rear side flap 316 extending from a rear edge portion of the first side panel 340a. The rear side flap 316 can have a width 308 of from about 1 inch to about 5 or more inches, e.g., about 2 inches. A fastening feature 364, such as a portion of hook-and-loop fastener material (e.g., a 2 inch wide strip of loop material), can be bonded, sewn, or otherwise attached to an inner surface of the side flap 316. The side flap 316 can also include a first notch 318a, and the second side panel 340b can include a corresponding second notch 318b, an upper notch 319a, and a lower notch 319b. In the illustrated embodiment, the first notch 318a can be about 0.25 inch wide and about 2 inches long, and the second notch 318b, the upper notch 319a, and the lower notch 319b can each be about 0.25 inch wide and about 1.5 inches long. As described in greater detail below, the notches 318 and 319 can be formed in the covering 310 to accommodate the corresponding flange portions 254 of the support members 250 when the first corner pad 162a is removably installed on the support members 250 as shown in FIG. 2. Accordingly, in other embodiments the notches 318 and 319 can have other dimensions, shapes, and/or sizes to accommodate different sizes of support members, flanges and/or other factors. In still further embodiments, one or more of the notches 318 and 319 can be omitted.

In the illustrated embodiment, a plurality of pleats or flaps 312 (identified individually as flaps 312a-c) are attached to the front panel 344 of the covering 310 so that they overlap each other in a shingle-like manner. The flaps 312 can be hingeably attached to the front panel 344 by suitable stitching 314 (e.g., nylon stitching) or other means (e.g., fasteners, adhesives, etc.) along an upper edge portion of each of the respective flaps 312. Moreover, the flaps 312 can be shaped, sized and/or positioned such that they are uniformly spaced with respect to the corresponding flaps 170 on the side pads 122 (FIG. 1). In addition, the third flap 312c can be configured to hang below the bottom panel 342b so that the third flap 312c covers the joint 136a (FIG. 1) between the side pad 122a and the corner pad 162a. In other embodiments, the flaps 312 can be omitted, or they can be replaced or supplemented by other means of reinforcing the front panel 344.

In one aspect of this embodiment, the first corner pad 162a can be wider than face of the first side pad 122a so that the joint 137a between the first corner pad 162a and the center pad 160 is offset inwardly from the first side pad 122a by a selected amount (FIG. 1). For example, in one embodiment the width dimension 302 of the first corner pad 162a can be from about 2 inches to about 10 inches wider than the face of the first side pad 122a. For example, the width dimension 302 can be from about 3 inches to about 6 inches, or about 4.5 inches wider than the face of the first side pad 122a. In other embodiments, the first corner pad 162a can have other widths, including widths that are the same as or less than the width of the face of the first side pad 122a.

FIG. 4 is a rear view of the corner pad core 370 taken substantially along line 4-4 in FIG. 3 in accordance with an embodiment of the disclosure. In one embodiment, the core 370 can be formed from a compressible foam, such as flexible polyurethane foam, having a density from about 0.5 pound per cubic foot to about 2 pound per cubic foot, e.g., about 1 pound per cubic foot. In other embodiments, other compressible materials can be used for the core 370.

A first fastening feature 466a, a second fastening feature 466b, and a third fastening feature 466c can be bonded or otherwise attached along an upper edge portion, a lower edge portion, and a side edge portion, respectively, of a rear face 434 of the core 370. In the illustrated embodiment, the fastening features 466 can include portions of hook-and-loop fastener materials (e.g., 2 inch wide strips of hook material) that can be attached to the core 370 with a spray adhesive or other suitable method known in the art. In other embodiments, the fastening features 466 can include adhesives and/or other releasable attachment systems (e.g., double-backed tape, etc.) known in the art. A groove 428 is cut into the rear face 434 of the core 370. As described in greater detail below, in this embodiment the groove 428 is sized and positioned to accommodate the flange portions 254b,c of the support members 250 (FIG. 2) when the removable corner pad 162a is attached to the support members 250.

Returning to FIG. 3, the first corner pad 162a can be assembled by slipping the covering 310 over the core 370. The flap 316 is then folded inwardly and pressed against the rear face 434 of the core 370 to attach the fastening feature 364 (e.g. the loop material 364) on the flap 316 to the corresponding fastening feature 466c (e.g., the hook material 466c) on the rear face 434 of the core 370. When the side flap 316 is in place, the first and second notches 318 should be aligned with the groove 428 in the core 370, enabling the groove 428 to be positioned over the abutting flange portions 254b, c when the first corner pad 162a is removably installed on the support members 250 (FIG. 2).

In one embodiment, an adhesive can be applied to the inside of the covering 310 and/or to all but the rear face 434 of the core 370 before the covering 310 is installed over the core 370 to bond the covering 310 to the core 370. In another embodiment, the covering 310 can be stitched or otherwise mechanically fastened to the core 370 after installation. Attaching the covering 310 to the core 370 in this manner can help prevent rotation of the core 370 inside the covering 310 during use. In a further embodiment, the rear face 434 of the core 370 can be bonded, fastened, or otherwise attached to its own separate backing (e.g., a metal or wood support member) to help prevent rotation of the core 370 during use. In this embodiment, the separate backing of the replaceable corner pad 162 can be releasably mounted to the support members 250 with, for example, portions of hook-and-loop fastener material, such as the portions of hook-and-loop fastener material 466a and 466b applied to the rear face 434 of the core 370 as shown in FIG. 4.

FIG. 5 is an exploded isometric view of the center pad 160 configured in accordance with an embodiment of the disclosure. Like the replaceable corner pads 162, the center pad includes a flexible and durable covering 510 disposed over a compressible core 570. The core 570 and the covering 510 can be manufactured from materials that are at least generally similar to those described above for the core 370 and covering 310 of the replaceable corner pads 162. In the illustrated embodiment, the center pad 160 can have a width dimension 502 of from about 4 feet to about 12 feet, e.g., from about 6 feet to about 9 feet, or about 7 feet, such as 7 feet 3 inches. In other embodiments, the center pad 160 can have other width dimensions 502.

In one aspect of this embodiment, the covering 510 can include a reinforcement hem 520 extending along a rear edge portion of a bottom panel 522, and a rear flap 516 extending outwardly from a rear edge portion of a top panel 524. The covering 510 can further include a first side panel 536a, an opposite second side panel 536b, and a front panel 532. Each of the side panels 536 can include a plurality of notches to accommodate the various flange portions 254 of the support members 250 (FIG. 2). For example, the first side panel 536a can include a first notch 518a and the second side panel 536b can include a second notch 518b. The core 570 includes a groove 528 on a rear face 534 that is aligned with the first and second notches 518a, b when the covering 510 is installed on the core 570. The notches 518 and the groove 528 fit over the abutting flange portions 254b, c of the support members 250a, b, respectively, when the center pad 160 is mounted to the support members 250. The first side panel 536a can further include a first upper notch 519a for accommodating the first flange portion 254a when the center pad 160 is mounted to the support members 250, and a first lower notch 519b for accommodating the fourth flange portion 254d. The second side panel 536b can similarly include a second upper notch 519c and a second lower notch 519d for the same purpose.

The covering 510 can further include a first side flap 580a extending outwardly from a first side portion of the top panel 524, and an opposite second side flap 580b extending outwardly from a second side portion of the top panel 524. The side flaps 580 can be made from, e.g., vinyl-coated fabric, such as vinyl-coated polyester fabric, and can be attached to the outer edge portions of the top panel 524 by stitching 582 and/or other suitable means known in the art. In one embodiment, each of the side flaps 580 can have a width 508 of from about 3 inches to about 10 inches, e.g., about 6 inches. In other embodiments, the side flaps 580 can have other shapes and sizes. In still further embodiments, the side flaps 580 can be omitted.

Referring to FIGS. 5 and 2 together, the center pad 160 can be fixedly attached to the support members 250 in one embodiment as follows. First, the first support member 250a can be joined to the second support member 250b so that the second flange portion 254b abuts the third flange portion 254c as shown in FIG. 2. Adhesive can then be applied to the rear face 534 of the core 570 and/or to the corresponding mating surfaces of the support members 250. The core 570 is then pressed onto the support members 250 so that the groove 528 in the core 570 fits over the abutting flange portions 254b, c of the support members 250. The covering 510 is then installed over the core 570 so that notches 518 in the covering 510 fit over the abutting flange portions 254b, c of the support members 250, and the notches 519 similarly fit over the respective flange portions 254a, d. The rear flap 516 of the covering 510 can then be folded downwardly over the back side of the first base portion 252a of the first support member 250a and nailed, screwed, glued or otherwise bonded or attached to the backside of the first support member 250a. Although not illustrated in FIG. 2, one or more fasteners, such as TEK screws, can be installed through the lower hem 520 of the covering 510 and the adjacent flange portion 254d of the second support member 250b to further secure the center pad 160 to the support members 250.

Once the center pad 160 has been suitably attached to the support members 250, the replaceable corner pads 162 can be attached to the support members 250 in one embodiment as follows. Referring to FIGS. 2-4 together and to the first corner pad 162a for ease of illustration, the first top flap 580a is pulled back and the first corner pad 162a is positioned so that the groove 428 in the core 370 and the corresponding notches 318 in the covering 310 align with the abutting second and third flange portions 254b, c of the support members 250. The upper notch 319a in the covering 310 is aligned with the first flange portion 254a, and the lower notch 319b is aligned with the fourth flange portion 254d (FIG. 3). The corner pad 162a is then pushed back against the support members 250 so that the first portion of hook-and-loop fastener material 466a (e.g., the first portion of hook material) on the rear face 434 of the core 370 attaches to the first portion of hook-and-loop fastener material 264a (e.g., the first portion of loop material) on the first support member 250a, and the second portion of hook-and-loop fastener material 466b (e.g., the second portion of hook material) on the rear face 434 of the core 370 attaches to the second portion of hook-and-loop fastener material 264b (e.g., the second portion of loop material) on the second support member 250b.

Once the corner pad 162 has been properly positioned against the support members 250, a first fastener 280a (e.g., a screw, such as a TEK screw or other self-tapping screw) can be installed through the first hem 320a of the cover 310 (FIG. 3) and into the first flange portion 254a of the first support member 250a. Similarly, a third fastener 280c and a fourth fastener 280d can be installed through the second hem 320b and into the fourth flange portion 254d of the second support member 250b, to further secure the replaceable corner pad 162a to the second support member 250b on the respective end of the center pad 160. The same, or at least a generally similar procedure, can be used to install the second corner pad 162b at the opposite end of the center pad 160.

Once the replaceable corner pads 162 have been suitably installed onto the support members 250, the top flaps 580 of the center pad 160 can be extended over the adjacent corner pads 162 to help prevent water infiltration through the joints 137 between the corner pads 162 and the center pad 160 and create a more efficient seal. A second fastener 280b can then be installed through the first top flap 580a, the first hem 320a, and into the first flange portion 254a to hold the first top flap 580a in place and further secure the first replaceable corner pad 162a to the first support member 250a. A fifth fastener 280e can be similarly installed through the second top flap 580b. In other embodiments, the top flaps 580 can be omitted, or they can be replaced by other sealing systems such as the system described below with reference to FIG. 6.

Once the center pad 160 and the replaceable corner pads 162 have been suitably attached to the support members 250, the head pad assembly 140 can be attached to the exterior wall 111 of the building 110 above the opening 112 (FIG. 1) in one embodiment as follows. Referring to FIG. 2, a plurality of upper brackets 284 (identified individually as a first upper bracket 284a, a second upper bracket 284b, and a third upper bracket 284c) can be fastened to the first flange portion 254a of the first support member 250a with fasteners 280g, f (e.g., self-tapping screws, such as TEK screws) or other suitable fasteners. End brackets 288 (identified individually as a first end bracket 288a and a second end bracket 288b) can be similarly fastened to each end of the second base portion 252b of the second support member 250b. In those embodiments using wood support members, the brackets 284 and 288 can be attached to the support members with lag screws or other suitable wood fasteners. Once the brackets 284 and 288 have been suitably attached to the support members 250, the brackets 284 and 288 can be attached to the wall 111 of the building 110 (FIG. 1) with fasteners 286 that are appropriate for the particular type of wall material (e.g., screws and expansion anchors if a masonry wall, through-bolts if a metal wall, lag screws if wood, etc.). In other embodiments, the assembled head pad assembly 140 can be attached to the wall 111 using other suitable methods know in the art. Such methods can include, for example, using other types of brackets, fasteners, and/or adhesives to attach the support members 250 to the wall 111.

Figure 6:
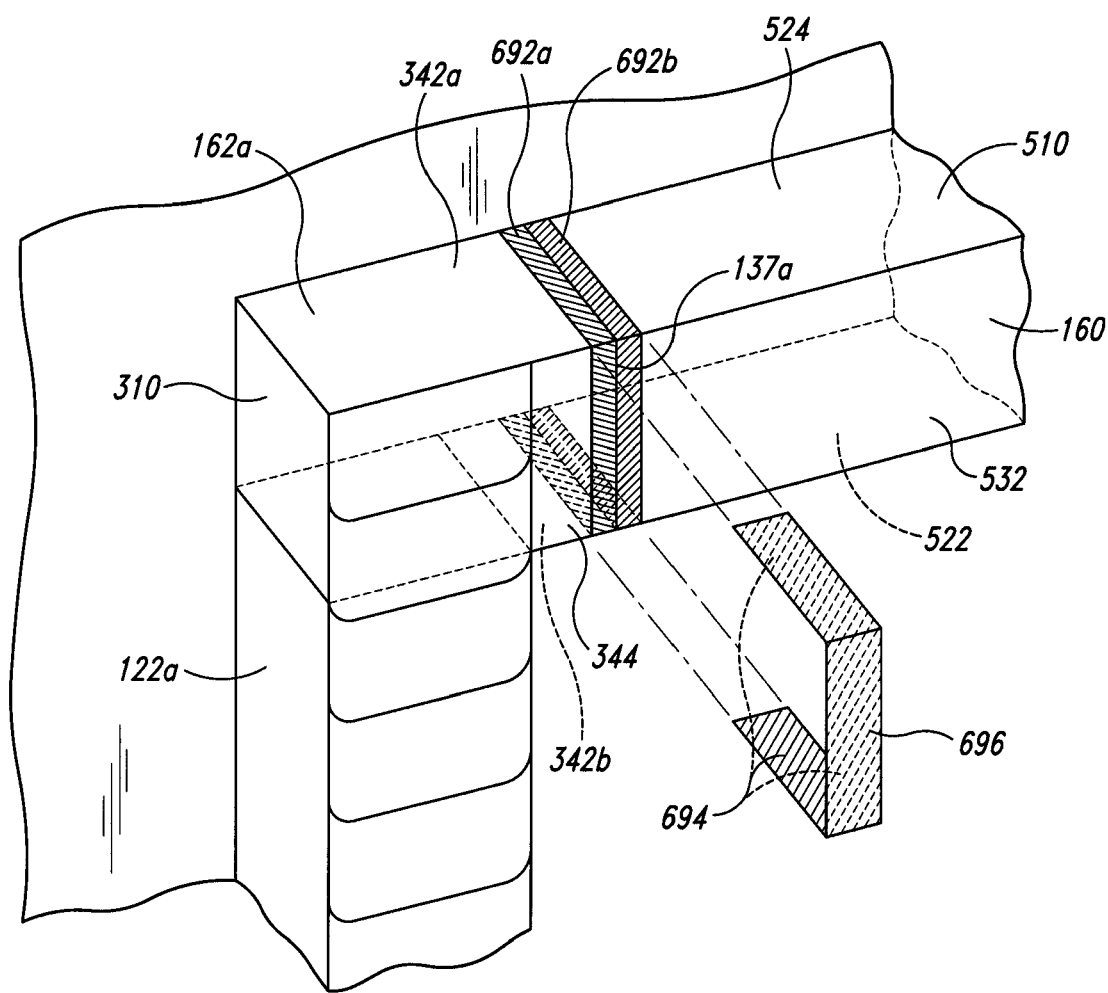
FIG. 6 is an isometric view of a portion of the head pad assembly of FIG. 2 illustrating a pad joint seal configured in accordance with an embodiment of the disclosure.

FIG. 6 is an isometric view of a portion of the head pad assembly 140 illustrating a pad joint seal configured in accordance with another embodiment of the disclosure. In one aspect of this embodiment, a first portion of hook-and-loop fastener material 692a (e.g., a first strip of hook material) can be bonded, sewn, or otherwise attached to the corner pad covering 310 along the edge portions of the top panel 342a, the front panel 344, and the bottom panel 342b near the pad joint 137a. A second portion of hook-and-loop fastener material 692b (e.g., a second strip of hook material) can be bonded, sewn, or otherwise attached to the center pad covering 510 along the edge portions of the top panel 524, the front panel 532, and the bottom panel 522 near the joint 137a. A third portion of hook-and-loop fastener material 694 (e.g., a strip of loop material) can be bonded, sewn, or otherwise attached to an inner surface of a portion of fabric 696 (e.g., a strip of coated fabric having a length and width sufficient to cover the first and second portions of hook-and-loop fastener material 692). To seal the joint 137a between the replaceable corner pad 162a and the center pad 160, the fabric 696 is wrapped around the joint 137a so that third portion of hook-and-loop fastener material 694 on the inside of the fabric 696 attaches to the first portion of hook-and-loop fastener material 692a on the corner pad 162a and the second portion of hook-and-loop fastener material 692b on the center pad 160, thereby covering the joint 137a between the two pads and preventing or at least reducing water infiltration or leakage.

Figure 7:
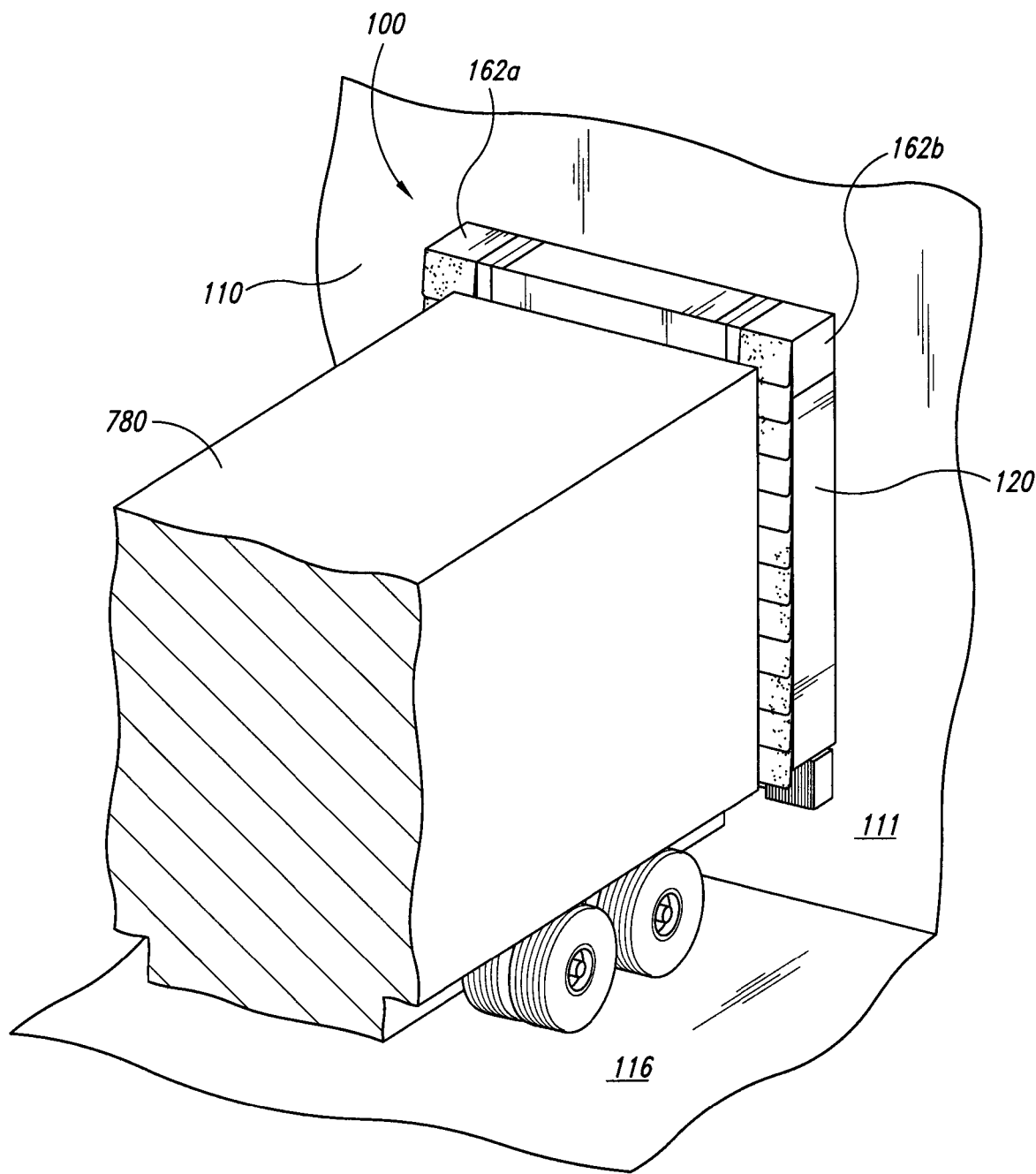
FIG. 7 is an isometric view of a vehicle backed into a dock seal configured in accordance with an embodiment of the disclosure.

FIG. 7 is an isometric view illustrating a vehicle 780 (e.g., an over-road trailer) that has been backed into the dock seal 120 for loading or unloading goods, materials, etc. to or from the building 110. As this view illustrates, the side and upper edge portions of the opened end of the vehicle 780 compress the adjacent portions of the seal 120 to provide at least a partial seal between the vehicle 780 and the building 110 and prevent rain, snow, outside air, etc. from entering the building 110. If one or both of the corner pads 162 become unacceptably worn from use, the damaged corner pad (e.g., the first corner pad 162a) can be easily replaced by removing the fasteners 280a-d, and then pulling the corner pad 162a away from the support members 250 to detach the fastening features 466a, b (FIG. 4) from the corresponding fastening features 264a, b, respectively (see FIG. 2). Because of its relatively small size, a new corner pad 162 can then be shipped to the site using a commercial carrier and installed as explained above by a single person using conventional tools.

Figure 8:
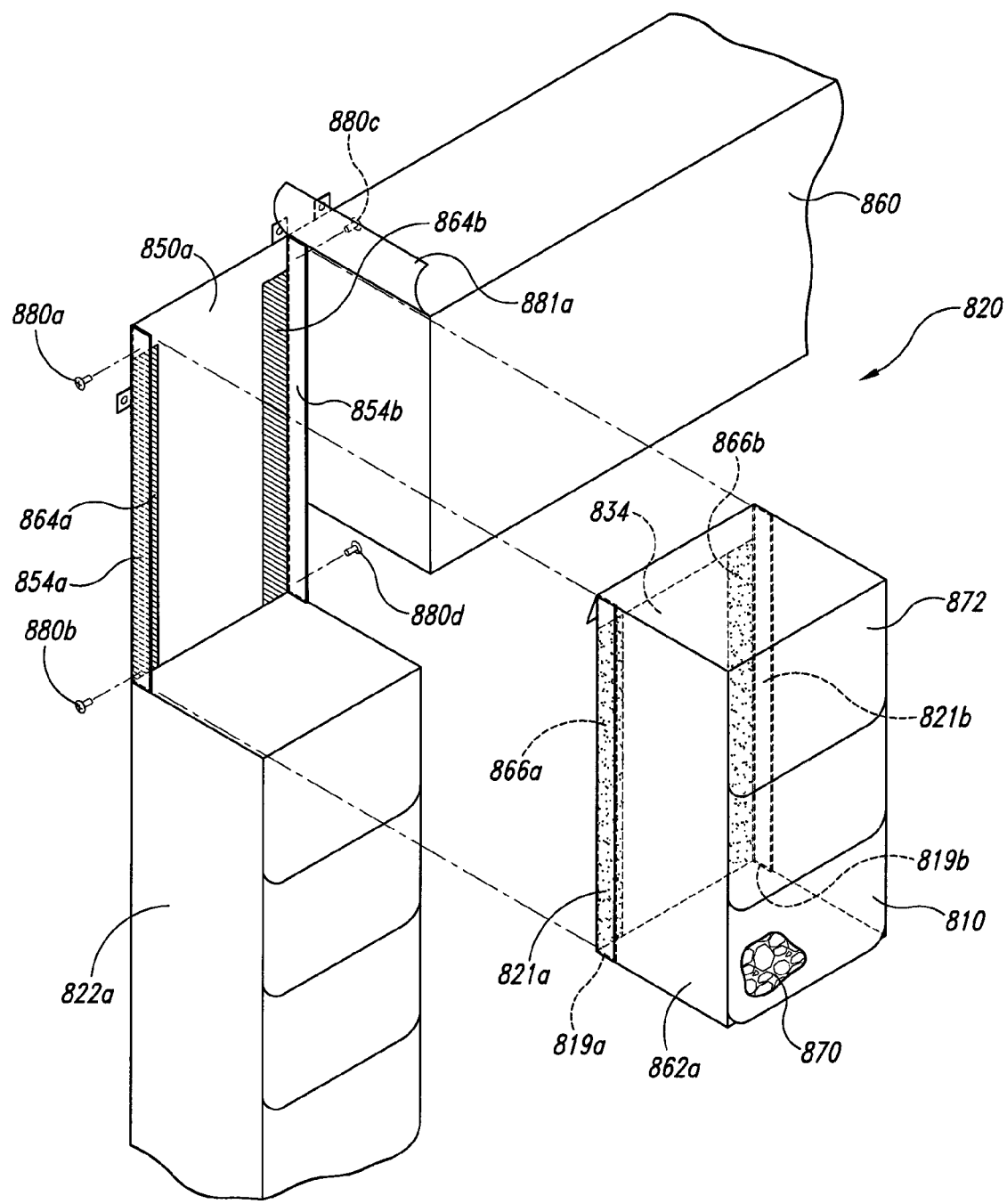
FIG. 8 is a partially exploded isometric view of a portion of a dock seal configured in accordance with another embodiment of the disclosure.

FIG. 8 is a partially exploded isometric view of a portion of a dock seal 820 configured in accordance with another embodiment of the disclosure. Many features of the dock seal 820 are at least generally similar in structure and function to the dock seal 120 described above with reference to FIGS. 1-7. In this particular embodiment, however, the dock seal 820 includes a first replaceable corner pad 862a that is releasably attached to a side pad support member 850a above a first side pad 822a. The side pad 822a can be at least generally similar in structure and function to the side pad 122a described above with reference to FIG. 1, and the support member 850a can be at least generally similar to the first support member 250a described above with reference to FIG. 2. For example, the support member 850a can include a first flange portion 854a and an opposite second flange portion 854b. The side pad 822a can be fixedly attached to the support member 850a in a manner that is at least generally similar to the manner in which the center pad 160 (FIG. 2) is attached to the support members 250. In other embodiments, the side pad 822a, the support member 850a, and/or the method of attaching the side pad 822a to the support member 850a can have other features and characteristics without departing from the present disclosure.

In one aspect of this embodiment, the support member 850a includes fastening features for releasably attaching the corner pad 862 to the support member 850a adjacent to a head pad 860. For example, a first portion of hook-and-loop fastener material 864a (e.g., a first portion of loop material) can be bonded or otherwise attached to a first edge portion of the support member 850a, and a second portion of hook-and-loop fastener material 864b can be similarly attached to an opposing second edge portion of the support member 850a.

The replaceable corner pad 862a can be at least generally similar in structure and function to the replaceable corner pad 162a described above with reference to FIGS. 1-4. For example, the corner pad 862a can include a compressible core 870 and a durable covering 810. The covering 810 can have a plurality of pleats or flaps 872 on a front surface thereof. A first hem 821a extends along a first vertical rear edge portion of the covering 810, and a second hem 821b extends along a second vertical rear edge portion of the covering 810. A first notch 819a is located in a lower rear edge portion of the covering 810 adjacent the first hem 821a, and a second notch 819b is similarly located adjacent the second hem 821b.

In this particular embodiment, an aft surface 834 of the core 870 carries a first portion of hook-and-loop fastener material 866a (e.g., a first portion of hook material) positioned toward a first vertical edge portion of the rear surface 834, and a second portion of hook-and-loop fastener material 866b (e.g., a second portion of hook material) positioned along a second vertical edge portion of the rear surface 834. To releasably attach the corner pad 862a to the support member 850a, the first and second portions of hook-and-loop fastener material 866 are aligned with the corresponding portions of hook-and-loop fastener material 864 on the support member 850a. The corner pad 862a is then pressed against the support member 850a with the first notch 819a fitting over the first flange portion 854a and the second notch 819b fitting over the second flange portion 854b. As the corner pad 862a is pressed against the support member 850a, the portions of hook-and-loop fastener material 866 attach to the corresponding portions of hook-and-loop fastener material 864. When installed, the corner pad 862a abuts both the side pad 822a and the head pad 860.

After the corner pad 862a has been releasably attached to the support member 850a, a plurality of fasteners 880 (e.g., TEK screws or other suitable fasteners) can be installed through the first and second hems 821a, b of the covering 810 and into the adjacent flange portions 854a, b, respectively, of the support member 850a to further secure the corner pad 862a to the support member 850a. A first top flap 881a on the head pad 860 can then be laid over the joint between the corner pad 862a and the head pad 860 to help seal the joint against moisture and/or air leakage. In one embodiment, the top flap 881a can be releasably attached to the replaceable corner pad 862a with hook-and-loop material (not shown). In other embodiments, the top flap 881a can be attached to the corner pad 862a with adhesives, screws, and/or other suitable fasteners.

Figure 9:
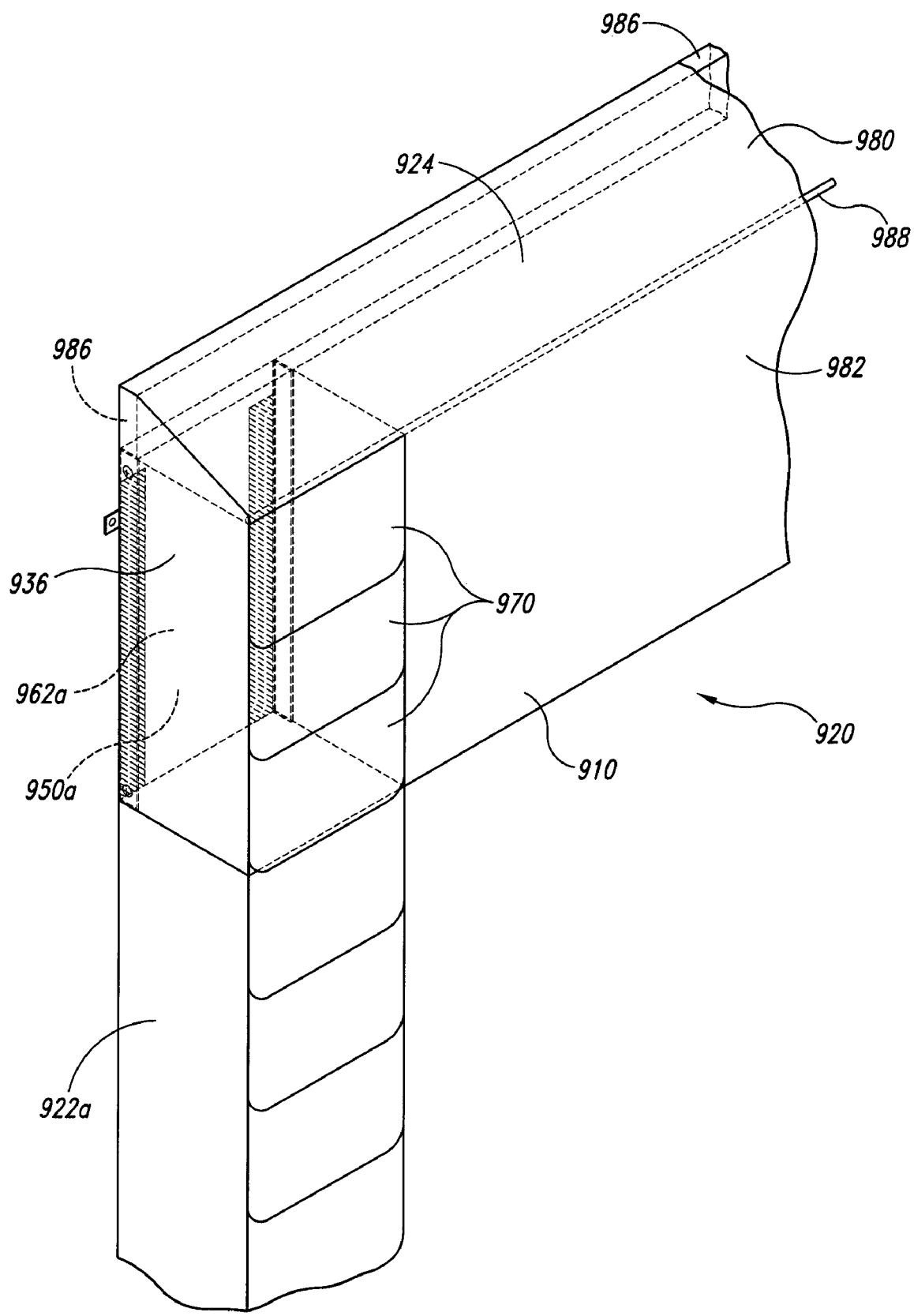
FIG. 9 is an isometric view of a portion of a dock seal configured in accordance with a further embodiment of the disclosure.

FIG. 9 is an isometric view of a portion of a dock seal 920 configured in accordance with a further embodiment of the disclosure. Many features of the dock seal 920 can be at least generally similar in structure and function to the dock seals 820 and 120 described in detail above with reference to FIGS. 1-8. For example, the dock seal 920 includes a first side pad 922a that is at least generally similar in structure and function to the first side pad 822a described above with reference to FIG. 8. The dock seal 920 also includes a first replaceable corner pad 962a that is at least generally similar in structure and function to the replaceable corner pad 862a described above with reference to FIG. 8. Moreover, the replaceable corner pad 962a can be attached to a vertical support member 950a in a manner that is at least generally similar to the manner in which the replaceable corner pad 862a is attached to the vertical support member 850a.

In the embodiment of FIG. 9, however, the replaceable corner pad 962a extends upwardly into a corner portion of a hood seal 980, and does not include any pleats or flaps. The hood seal 980 is configured to extend horizontally across a top portion of the opening 112 in the building 110 (FIG. 1). The hood seal 980 can include a covering 910 constructed from various types of durable and resilient materials such as, for example, vinyl coated polyester fabric and/or other suitable materials known in the art. The covering 910 is attached to a rear support member 986 (e.g., a wood support member such as a 2×4 or other suitable wood member) that is fixedly attached to the wall 111 of the building 110 above the opening 112 using screws, brackets, etc. The covering 910 can include a top panel 924 that extends at a downward slope from the rear support member 986 to an outer edge support member 988 (e.g., a support pipe such as a 1.0 inch diameter metal pipe) that extends through a pocket or sleeve in the covering 910. The outer edge support member 988 extends horizontally in front of the rear support member 986 and is supported by upper portions of the first corner pad 962a and the corresponding second corner pad (not shown). A curtain or front panel 982 hangs downwardly from the edge support member 988 in front of the replaceable corner pad 962a. In the illustrated embodiment, the outer edge portions of the front panel 982 includes a series of pleats or flaps 970 aligned with corresponding flaps on the side pad 922a to protect the hood seal 980 from wear due to impacts from trailer trucks and/or other vehicles. An end panel 936 closes out the side of the covering 910. Although only one end portion of the hood seal 980 is shown in FIG. 9, the opposing end portion of the hood seal 980 on the other side of the door opening can be the essentially the same in structure and function.

From the foregoing, it will be appreciated that specific embodiments have been described herein for purposes of illustration, but that the disclosure encompasses additional embodiments as well. For example, the head pad assemblies and/or the side pads described above with reference to FIGS. 1-9 may have different configurations and/or include different features. In several embodiments, for example, the side pads 122, 822, and 922, the corner pads 162, 862, and 962, and/or the center pads 160 and 860 in any of the foregoing embodiments may have a different shapes or different dimensions (e.g., trapezoidal shapes, V-shapes, sloped surfaces, etc.). In still other embodiments, the compressible core portions described above may be composed of materials other than foam. For example, they may be composed of rubber, an elastic material, or another suitable resilient, compressible material. In yet other embodiments, the dock seals 120 and 820 can include a hood or other suitable upper member in lieu of or in addition to the head pad assembly 140, the center pads 160 and 860, and/or the corner pads 162 and 862.

Specific elements of any of the foregoing embodiments can be combined or substituted for elements in other embodiments. For example, the head pad assembly 140 can be used with side pads that differ from the side pads 122 described above. Furthermore, while advantages associated with certain embodiments of the disclosure have been described in the context of these embodiments, other embodiments may also exhibit such advantages, and not all embodiments need necessarily exhibit such advantages to fall within the scope of the disclosure. Accordingly, the disclosure is not limited, except as by the appended claims.

I claim:

1. An apparatus for forming at least a partial seal between an open end of a vehicle and a wall of a building proximate an opening in the building, the apparatus comprising:
    a first side pad configured to extend vertically adjacent to a first side portion of the opening, wherein the first side pad includes a first compressible foam portion covered by a first fabric cover;
    a second side pad configured to extend vertically adjacent to a second side portion of the opening opposite the first side portion of the opening, wherein the second side pad includes a second compressible foam portion covered by a second fabric cover; and
    a head pad assembly configured to extend horizontally across a top portion of the opening in the building, wherein the head pad assembly includes:
        a first support member portion configured to be fixedly attached to the wall of the building proximate a first upper corner of the opening;
        a second support member portion configured to be fixedly attached to the wall of the building proximate a second upper corner of the opening;
        a first corner pad that includes a third compressible foam portion covered by a third fabric cover, wherein at least a portion of the third fabric cover is configured to contact a first corner portion of the open end of the vehicle; and
        a second corner pad that includes a fourth compressible foam portion covered by a fourth fabric cover, wherein at least a portion of the fourth fabric cover is configured to contact a second corner portion of the open end of the vehicle;

a first releasable fastening feature carried by one of a front portion of the first support member portion or a rear portion of the first corner pad, wherein the first releasable fastening feature releasably attaches to the other of the front portion of the first support member portion or the rear portion of the first corner pad to removably attach the first corner pad to the first support member portion above the first side pad, wherein the first corner pad is configured to be removed from the first support member portion while the first support member portion remains fixedly attached to the wall of the building; and a second releasable fastening feature carried by one of a front portion of the second support member portion or a rear portion of the second corner pad, wherein the second releasable fastening feature releasably attaches to the other of the front portion of the second support member portion or the rear portion of the second corner pad to removably attach the second corner pad to the second support member portion above the second side pad, wherein the second corner pad is configured to be removed from the second support member portion while the second support member portion remains fixedly attached to the wall of the building.

2. The apparatus of claim 1 wherein the first support member portion is disposed between the first corner pad and the wall of the building, and the second support member portion is disposed between the second corner pad and the wall of the building.

3. The apparatus of claim 1 wherein the first and second support member portions are portions of a single support member configured to be at least partially disposed between the first and second corner pads and the wall of the building.

4. The apparatus of claim 1 wherein the first and second support member portions are opposing end portions of a single support member that extends horizontally across the top portion of the opening in the building.

5. The apparatus of claim 1 wherein the first support member portion is a portion of a first support member configured to be at least partially disposed between the first corner pad and the wall of the building, and wherein the second support member portion is a portion of a second support member configured to be at least partially disposed between the second corner pad and the wall of the building.

6. The apparatus of claim 1 wherein the first support member portion is a portion of a first support member configured to extend vertically adjacent to the first side portion of the opening, and wherein the second support member portion is a portion of a second support member configured to extend vertically adjacent to the second side portion of the opening.

7. The apparatus of claim 1 wherein the head pad assembly further comprises a center pad configured to extend horizontally across a top portion of the opening in the building between the first and second corner pads.

8. The apparatus of claim 1 wherein the first and second support member portions are opposing end portions of a single support member that extends horizontally across the top portion of the opening in the building, and wherein the head pad assembly further comprises a center pad configured to be attached to the support member between the first and second corner pads.

9. An apparatus for forming at least a partial seal between an open end of a vehicle and a wall of a building proximate an opening in the building, the apparatus comprising:

a first side pad configured to extend vertically adjacent to a first side portion of the opening, wherein the first side pad includes a first compressible foam portion covered by a first fabric cover;

a second side pad configured to extend vertically adjacent to a second side portion of the opening opposite the first side portion of the opening, wherein the second side pad includes a second compressible foam portion covered by a second fabric cover; and a head pad assembly configured to extend horizontally across a top portion of the opening in the building, wherein the head pad assembly includes:

a first support member portion configured to be fixedly attached to the wall of the building proximate a first upper corner of the opening;

a second support member portion configured to be fixedly attached to the wall of the building proximate a second upper corner of the opening;

a first corner pad configured to be removably attached to the first support member portion above the first side pad, wherein the first corner pad includes a third compressible foam portion covered by a third fabric cover;

a second corner pad configured to be removably attached to the second support member portion above the second side pad, wherein the second corner pad includes a fourth compressible foam portion covered by a fourth fabric cover;

wherein the first corner pad is configured to be removed from the first support member portion while the first support member portion remains fixedly attached to the wall of the building, and wherein the second corner pad is configured to be removed from the second support member portion while the second support member portion remains fixedly attached to the wall of the building; and a center pad configured to extend horizontally across a top portion of the opening in the building between the first and second corner pads;

wherein the first corner pad is configured to abut a first side surface of the center pad and a first top surface of the first side pad; and wherein the second corner pad is configured to abut a second side surface of the center pad and a second top surface of the second side pad.

10. The apparatus of claim 1:

wherein the first corner pad carries the first releasable fastening feature for releasably attaching the first corner pad to the first support member portion; and wherein the second corner pad carries the second releasable fastening feature for releasably attaching the second corner pad to the second support member portion.

11. The apparatus of claim 1:

wherein the first corner pad is spaced apart from the second corner pad;

wherein the first support member portion carries the first releasable fastening feature;

wherein the second support member portion carries the second releasable fastening feature;

wherein the first corner pad includes a first portion of a hook-and-loop fastener material for releasably attaching the first corner pad to the first releasable fastening feature; and wherein the second corner pad includes a second portion of a hook-and-loop fastener material for releasably attaching the second corner pad to the second releasable fastening feature.

12. The apparatus of claim 1 wherein the first and second support member portions are opposing end portions of a single support member that extends horizontally across the top portion of the opening in the building, wherein the head pad assembly further comprises a center pad configured to be attached to the support member between the first and second corner pads, wherein the first releasable fastening feature is carried by the first support member portion, wherein the second releasable fastening feature is carried by the second support member portion, and wherein the apparatus further comprises:
　a third releasable fastening feature carried by the rear portion of the first corner pad, wherein the third releasable fastening feature is configured to releasably attach to the first releasable fastening feature to releasably attach the first corner pad to the first support member portion; and
　a fourth releasable fastening feature carried by the rear portion of the second corner pad, wherein the fourth releasable fastening feature is configured to releasably attach to the second releasable fastening feature to releasably attach the second corner pad to the second support member portion.

13. An apparatus for forming at least a partial seal between an open end of a vehicle and a wall of a building around an opening in the building, the apparatus comprising:
　a first compressible side member configured to extend vertically adjacent to a first side portion of the opening;
　a second compressible side member configured to extend vertically adjacent to a second side portion of the opening opposite the first side portion of the opening;
　at least one support member configured to be fixedly attached to the wall of the building adjacent to the opening;
　a head seal configured to extend horizontally across a top portion of the opening;
　a compressible corner member; and
　a first mounting system comprising:
　　a first releasable fastening feature carried by a front portion the first support member portion; and
　　a second releasable fastening feature carried by a rear portion of the compressible corner member, wherein the second releasable fastening feature is configured to releasably attach to the first releasable fastening feature to releasably attach the compressible corner member to the at least one support member above the first side member.

14. The apparatus of claim 13 wherein the at least one support member is a first support member configured to be fixedly attached to the wall of the building adjacent to the first side portion of the opening, wherein the first compressible side member is configured to be fixedly attached to the first support member, and wherein the apparatus further comprises:
　a second support member configured to be fixedly attached to the wall of the building adjacent to the second side portion of the opening, wherein the second compressible side member is configured to be fixedly attached to the second support member; and
　a second compressible corner member having a second mounting system for releasably attaching the second compressible corner member to the second support member above the second side member.

15. The apparatus of claim 13, wherein the at least one support member is configured to be fixedly attached to the wall of the building above the opening, wherein the head seal includes a compressible head member configured to be fixedly attached to the at least one support member, wherein the compressible corner member is a first compressible corner member, and wherein the apparatus further comprises:
　a second compressible corner member having a second mounting system for releasably attaching the second compressible corner member to the at least one support member above the second side member.

16. The apparatus of claim 15
　wherein the first compressible corner member is configured to abut a first side surface of the compressible head member and the second compressible corner member is configured to abut a second side surface of the compressible head member so that the combination of the first compressible corner member, the second compressible corner member, and the compressible head member form a compressible seal between an upper edge of the open end of the vehicle and the building.

17. The apparatus of claim 15, further comprising:
　a first joint seal configured to overlay a first joint between the first compressible corner member and the compressible head member; and
　a second joint seal configured to overlay a second joint between the second compressible corner member and the compressible head member.

18. The apparatus of claim 15 wherein the at least one support member is an elongate member that extends between the wall of the building and the compressible head member and the first and second compressible corner members.

19. The apparatus of claim 15:
　wherein the first compressible corner member has a first rear surface, the second compressible corner member has a second rear surface, and the compressible head member has a third rear surface;
　wherein the first compressible corner member includes a first releasable fastening feature on the first rear surface for releasably attaching the first compressible corner member to the at least one support member;
　wherein the second compressible corner member includes a second releasable fastening feature on the second rear surface for releasably attaching the second compressible corner member to the at least one support member; and
　wherein the third rear surface of the compressible head member is adhesively bonded to the at least one support member.

20. The apparatus of claim 13, wherein the head seal includes a hood seal, and wherein at least a portion of the compressible corner member extends under a portion of the hood seal.

21. A system for at least partially sheltering an open end of a trailer positioned adjacent to an opening in a building, the system comprising:
　means for sealing a first gap portion between a first side edge of the open end of the trailer and a wall of the building proximate a first side portion of the opening;
　means for sealing a second gap portion between a second side edge of the open end of the trailer and the wall of the building proximate a second side portion of the opening;
　pad support means fixedly attached to the wall of the building;
　a first releasable fastening feature carried by a first front portion of the pad support means;
　a first replaceable corner pad;

a second releasable fastening feature carried by a rear portion of the first replaceable corner pad, wherein the second releasable fastening feature is configured to releasably attach to the first releasable fastening feature to releasably attach the first replaceable corner pad to the pad support means to seal a third gap portion between a first upper corner edge of the open end of the trailer and the wall of the building proximate a first upper corner portion of the opening;

a third releasable fastening feature carried by a second front portion of the pad support means;

a second replaceable corner pad; and a fourth releasable fastening feature carried by a rear portion of the second replaceable corner pad, wherein the fourth releasable fastening feature is configured to releasably attach to the third releasable fastening feature to releasably attach the second replaceable corner pad to the pad support means to seal a fourth gap portion between a second upper corner edge of the open end of the trailer and the wall of the building proximate a second upper corner portion of the opening.

22. The system of claim 21, further comprising:

a head pad for sealing a fifth gap portion between an upper edge of the open end of the trailer and the wall of the building, wherein the head pad is fixedly attached to the pad support means between the first and second replaceable corner pads.

23. The system of claim 21, further comprising:

a head pad for sealing a fifth gap portion between an upper edge of the open end of the trailer and the wall of the building; and means for fixedly attaching a rear surface of the head pad to the pad support means between the first and second replaceable corner pads.

* * * * *

UNITED STATES PATENT AND TRADEMARK OFFICE
CERTIFICATE OF CORRECTION

| | | |
|---|---|---|
| PATENT NO. | : 8,181,401 B2 | Page 1 of 1 |
| APPLICATION NO. | : 12/360082 | |
| DATED | : May 22, 2012 | |
| INVENTOR(S) | : William C. Eungard | |

It is certified that error appears in the above-identified patent and that said Letters Patent is hereby corrected as shown below:

In column 1, line 27, delete "fork lifts," and insert -- forklifts, --, therefor.

In column 18, line 13, in claim 16, after "claim 15" insert -- : --.

Signed and Sealed this
Thirty-first Day of July, 2012

David J. Kappos
*Director of the United States Patent and Trademark Office*